Aug. 26, 1941.  R. L. MELTON ET AL  2,254,016

COATING APPARATUS

Filed Jan. 20, 1933  2 Sheets-Sheet 1

*INVENTORS*
ROMIE L. MELTON
RAYMOND C. BENNER
BY HENRY P. KIRCHNER
*RCBenner*
*ATTORNEY*

Aug. 26, 1941.   R. L. MELTON ET AL   2,254,016
COATING APPARATUS
Filed Jan. 20, 1933   2 Sheets-Sheet 2

INVENTORS
ROMIE L. MELTON
RAYMOND C. BENNER
BY HENRY P. KIRCHNER
ATTORNEY

Patented Aug. 26, 1941

2,254,016

UNITED STATES PATENT OFFICE 2,254,016

COATING APPARATUS

Romie L. Melton, Raymond C. Benner, and Henry P. Kirchner, Niagara Falls, N. Y., assignors, by mesne assignments, to The Carborundum Company, Niagara Falls, N. Y., a corporation of Delaware Application January 20, 1933, Serial No. 652,638

10 Claims. (Cl. 91—18)

This invention relates to improved apparatus for the manufacture of granular coated webs of such material as paper, cloth and the like, and has for an object the provision of apparatus for the manufacturer of superior articles.

Abrasive particles commonly used in the manufacture of abrasive coated webs are of irregular shape and have some surfaces or edges that are sharper than others and more suitable for abrading operations when these sharper surfaces, edges or points, are positioned to engage the material being abraded. The usual method of applying granular particles to a web has been by dropping the particles from a hopper onto an adhesive coated surface, and since the particles, when dropped, fall in a haphazard manner, the usual method has not resulted in an orderly orientation of the particles.

It has been found heretofore that better abrasive coated webs can be produced by causing at least some of the granular particles deposited upon the web to become so oriented that the longer dimension of each grain projects from the surface of the web.

One form of apparatus that has been found to give satisfactory results has included electrostatic means for projecting the granular material upwardly and into engagement with the adhesively coated side of the web. In apparatus of this type, the adhesively coated web is supported with an adhesive coated side downwardly whereby the grains, when projected by the electrostatic means, strike this downward positioned side and adhere thereto. The electrostatic means used in such apparatus has included a high tension electrode positioned beneath the coated web and a low tension electrode positioned above the coated web, with a carrier means such as a canvas belt so positioned that the grain carrying side of the conveyor is between the lower electrode and the adhesively coated web. This apparatus is fully disclosed and claimed in our co-pending application, Serial No. 636,982, filed October 10, 1932 and now Patent No. 2,187,624.

The apparatus of the foregoing description operates in the following manner: The granular material being carried by the conveyor comes into the electrostatic field set up between the two electrodes and is projected upwardly and into engagement with the adhesively coated web. Apparatus of the kind just described has the disadvantage that it cannot always be made to project the larger and heavier particles upwardly to a sufficient distance to engage the adhesive surface of the web. While it is possible to make adjustments in the field intensity to project grains of widely different sizes, practical limitations in the intensity of the field that can be used cause this type of machine to be somewhat restricted in its application.

Another type of apparatus that has been found to possess considerable merit in the manufacture of granular coated webs comprises mechanical means for projecting the granular material from a conveyor upwardly and into engagement with the underside of an adhesively coated web. The orienting characteristics of machines of this type depend upon the capability of the projecting means to impart sufficient velocity to the particles to cause them to travel through the intervening space with their longer axes parallel to their direction of movement. Machines of this type are fully described and claimed in our copending application Serial No. 647,241, filed December 14, 1932 and now Patent No. 2,141,658.

In the machines of this type there is no difficulty in projecting even the largest and heaviest of particles but these machines do not have the orienting capabilities of the electrostatic apparatus described above, because the particles, upon leaving the conveyor, are no longer under the influence of the projecting means; whereas in the electrostatic apparatus described above, the particles are under the influence of the projecting means until they reach the adhesive coated web.

Apparatus built in accordance with our invention utilizes the combination of electrical forces and mechanical forces to project and at the same time maintain orientation of the moving granular material, whereby the machines are suitable for projecting large and heavy particles as well as the smaller and lighter particles.

We wish to have it understood that wherever the term "mechanical force" is used in the present specification, it shall be taken to mean any force excepting electrical forces that produce or tend to produce motion of objects of appreciable size such as those ordinarily called granules or powders when such force is applied to those objects. We wish it to be understood also that the term "electro-mechanical," wherever used in the present specification and/or claims, shall be taken to mean the combination of electrical and mechanical forces or a combination of such elements that produces a combination of electrical and mechanical forces.

An understanding of our invention can be obtained by referring to the drawings, in which Figures 1 and 2 are diagrammatic elevations of different forms of apparatus;

Figure 1:
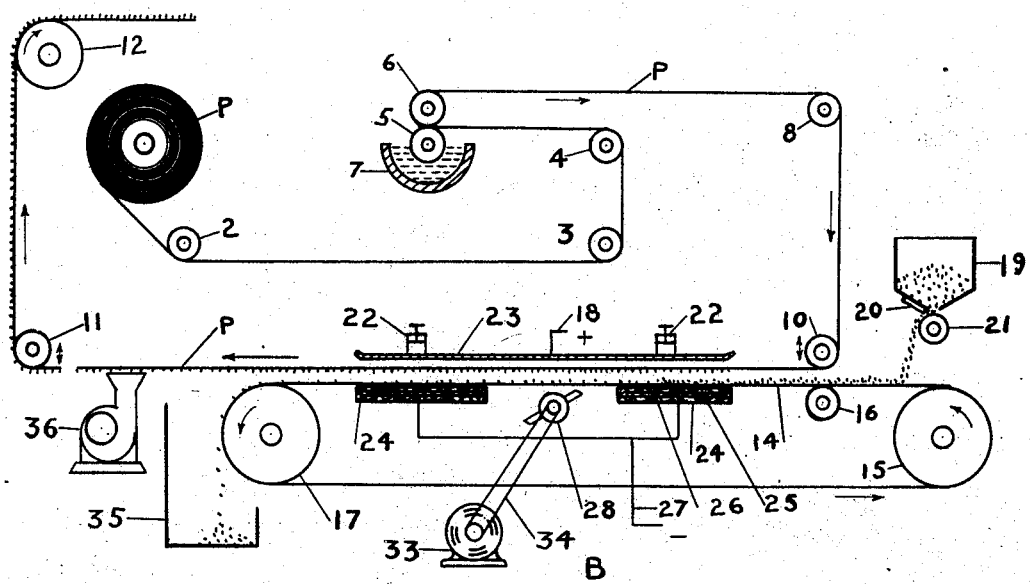

Referring to the drawings, Figure 1 illustrates one form of apparatus for carrying out our invention. In this drawing the web P is shown threaded over the roll 2 and in contact with the idler rolls 3 and 4 to the pressure roll 6 and the adhesive roll 5. The adhesive roll 5 dips into liquid adhesive, contained in the adhesive tank 7, and by its rotation, applies a layer of adhesive to the web P. The adhesively coated web is then passed partially around the guiding roll 8 and in contact with the adjustable idler roll 10 to another adjustable guiding roll 11, the web contacting with each of these guiding rolls on the uncoated side of said web. Thus, the adhesive coated web is moved to a position with the adhesive side facing downward. Located in close proximity to the adhesive coated web and in a position prior to the point at which the adhesive acquires an appreciable set, is the grain projecting means B.

The grain projecting means B comprises an endless belt 14, of such material as canvas, rubberized fabric and the like, supported in a position parallel to the coated web by means of the pulleys 15, 16 and 17. A grain hopper 19 with an adjustable feed gate 20 and a dispensing roll 21 is positioned to deliver granular material to the upper side of the endless belt 14, which in turn is driven by suitable means, not shown, to cause the granular material deposited thereon to be carried beneath the web P. An electrode or condenser plate 23, of good conducting material, such as metal, is supported by the lugs 22 in a position above the adhesively coated web P, where the web is parallel to the grain belt. Low conductivity electrodes 24 are located beneath the upper surface of the grain feed belt 14 and underneath the upper electrode 23.

The means B, for applying granular material, also comprises a source of electromotive force, the effective potential of which is 30,000 volts, or more, not specifically shown in the drawing, but indicated by the positive (+) and negative (—) symbols. The source of electromotive force may produce a continuous unidirectional current, alternating current or rectified alternating current. Ordinarily and for more efficient operation, the lower electrodes are connected to the negative terminal by the conductor 27 and the upper electrode 23 is connected to the positive side by the conductor 18 and is also grounded as a precautionary measure.

Located beneath the belt 14 and in close proximity to the low conductivity electrodes 24 are means for vibrating the belt, such as the beater 28, mounted on a suitable support, not shown in the drawing. This beater is rotatable at speeds as desired, by means of the driving motor 33 and belt 34, and is so positioned with respect to the upper surface of the belt that upon rotation they deliver quick, sharp blows to the underside thereof.

The striking of the beaters 28 against the under side of the belt causes the granules carried by the belt to be projected upwardly, and because of their upward projection through space, a portion of the grains become oriented with their major dimension parallel to the path of flight. In addition, the forces produced by the electrostatic field, set up between the upper plate 23 and the lower electrodes 24, cooperate with these previously described mechanical forces in producing a desired orientation and uniform distribution of the granules being deposited on the web P. It is believed that the granules become electrically charged as they move between the upper and lower electrodes and that the electrical charge carried by the particles congregates towards the opposite ends where the curvature is greatest, thus forming electrical doublets. Forces produced by the electrical field then produce a turning moment which tends to turn the individual particles so that their major axes are parallel to the lines of force of the field and also to assist in propelling said particles from the feed belt to the adhesively coated surface of the web P where they adhere in a vertically oriented position. The oriented particles, instead of moving in a body from the belt to the adhesive coated web, move as a spray or rain of individual particles separately spaced from one another.

Provision for causing the adhesive to acquire at least a preliminary set after the granules have been deposited on the web is made by incorporating a blower 36 capable of delivering a large volume of air at a low velocity against the granular coated surface. This blower 36 is located between the grain projecting means and the idler roll 11 and causes the adhesive to set or acquire sufficient firmness to prevent the granules from being positioned in any other manner than that desired before the direction of movement of the web is changed.

From the roll 11, the coated web is drawn over the suction drum 12 to a suitable drying chamber, not shown in the drawing.

A bin 35 receives the particles or surplus grain which do not adhere to the coated web, but fall back onto the feed belt and are carried out of the depositing zone.

The lower electrode 24 is composed of a metal plate 25, entirely surrounded by a sheath 26, which is of some poorly conducting material. The material should be so poorly conducting that not enough current can flow along or through it to cause arcing between the two electrodes, yet it should be sufficiently conducting to allow a small leakage current to supply negative charges to the particles in order that they may be acted upon by the electrostatic field.

Figure 2:
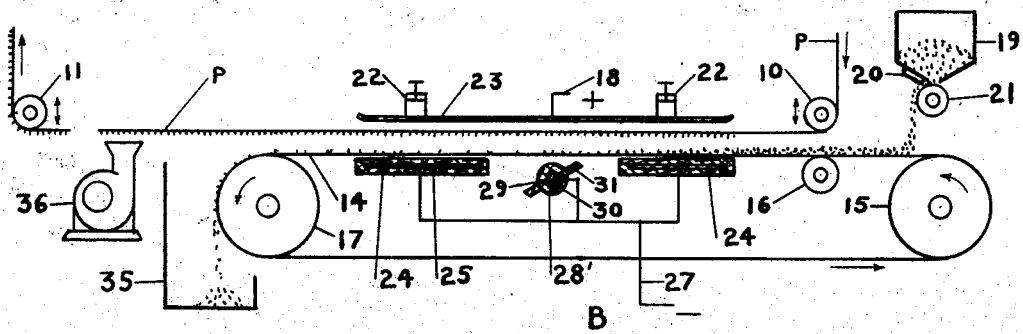
Figure 3:
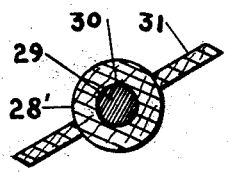
Figure 3 is an enlarged end view of part of the apparatus shown in Figure 2.

In the apparatus illustrated in Figure 2 the rotating beater 28', which is more clearly illustrated by Figure 3, is composed of a central metal or conducting shaft 29, enclosed in a sheath of poorly conductor material 30. Projecting fins 31, also of poorly conducting material are secured to the sheath 30 and form blades or impacting members which strike the under side of the feed belt 14 upon rotation of the beater 28. The conducting shaft is connected to the negative terminal of the high voltage source of electromotive force and becomes both a rotating beater and a highly charged electrode. Thus the electrostatic field is intensified at the point where the maximum amplitude of oscillation of the feed belt 14 occurs and increases the electrostatic forces acting upon the grain at this point where the grain is projected farthest and the electrostatic forces are most beneficial.

While we have illustrated a rotating beater 28 as the belt vibrating means, it is to be understood that other types of vibrators, such as reciprocating, rocking and/or electromagnetic vibrators may be utilized for this purpose.

Figure 4:
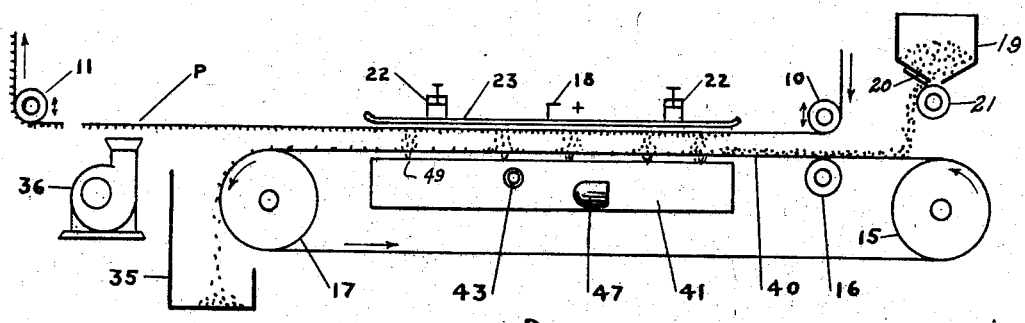
Figure 4 is a diagrammatic elevation of another form of apparatus.

The modification shown in Figure 4 is similar to that shown in Figure 1 except that fluid pressure means is used in combination with electrostatic means for orienting and projecting granular particles upward onto an adhesively coated web. The apparatus illustrated herewith comprises an endless belt 40, of such material as mesh woven silk, positioned parallel to the web P and supported by the driving pulley 15 and idler pulleys 16 and 17. A grain hopper 19 with an adjustable feed gate 20 and dispensing roll 21 is positioned to deliver granular material to the upper side of the mesh grain feed belt 40, which in turn is driven by means not shown to cause the granular material to be carried into a position beneath the web P. A metal electrode or condenser plate 23 is located above the adhesively coated web and supported by means of the lugs 22. Located beneath the upper surface of the mesh belt and in juxtaposition to the condenser plate 23 is a partially enclosed grid-like electrode 41 adapted to be charged at a high potential and also to direct one or more streams of gas through the mesh grain conveyor.

Figure 5:
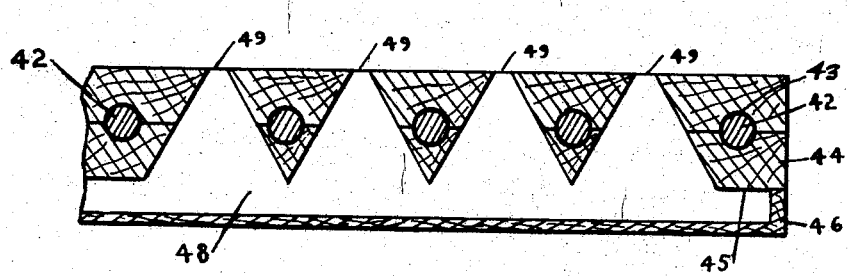
Figure 5 is a cross-sectional view taken along the line V—V of Figure 6.
Figure 6:
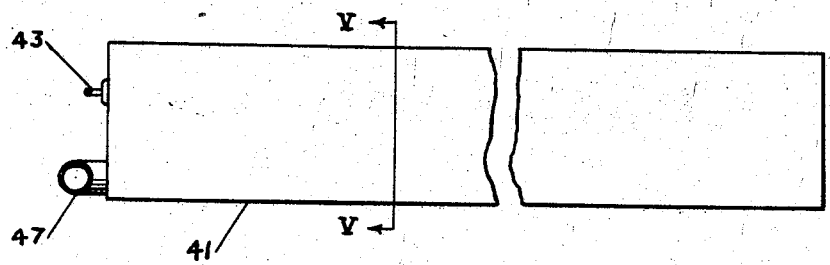
Figure 6 is a side elevation of part of the apparatus shown in Figure 3.

The electrode 41 shown in Figures 5 and 6 comprises a series of conducting members 42 (which are connected to a source of high potential by the connecting cable 43 and encased in poorly conducting materials 43 and 44. At one end of the electrode is a tubular connection 47 opening into the hollow portion 48 of the electrode and adapted to convey air or other gas into said chamber 48. Restricted orifices 49, which are of a length as great as the width of the web, are located in the upper surface of the electrode and adapted to direct streams or curtains of the compressed gas upward through the mesh belt at a high velocity and low volume. These curtains of high velocity gas project the granules from the mesh belt upward onto the underside of the adhesively coated web. As the granules move through the intervening space air resistance causes them to become oriented so that their major dimensions are parallel to the direction of flight. In addition, the forces produced by the electrostatic field set up between the upper condenser plate 23 and the lower electrode 41 co-act with the orienting force, due to air resistance, in producing a desired orientation and uniform distribution of the particles being deposited on the web P.

In speaking of poorly conducting material, we use this expression to distinguish between such materials as metals, which are relatively good conductors of electricity, on the one hand, and highly insulating materials such as glass, hard rubber, and the like, which are such good insulators at the voltages we prefer to apply to our apparatus that the leakage current which flows through them is insufficient to charge the granular particles to the degree necessary to cause them to be oriented during their passage through the electrostatic field.

For this purpose we have found dry, knot-free pine wood to be satisfactory. While dry wood is so poorly conducting that it will not permit enough leakage current to produce arcing between the two electrodes, it is conductive enough to allow sufficient leakage at the operating voltages to supply the electrical charge to the particles which is required for their orientation and distribution.

While we have found ordinary dry wood free from knots to be the most satisfactory material so far used, other materials that ordinarily are classed as insulators but which are, in fact, poor conductors of high tension electric current may be employed. Such materials include fibrous materials bonded with an insulating resin such as "Bakelite." Such fibrous material should not have insulating laminations through it, but the fibers of the material should furnish poor electrical conducting paths from the metal conductor to the upper electrode surface.

Apparatus constructed in accordance with our invention has certain distinct advantages over machines previously known and use for the purpose of producing a granular coated web in which the particles we so arranged on the web that their major axes projected from the web. Among the advantages belonging to machines built in accordance with our invention is the ability to project large and heavy particles, which the previously known electrostatic machines would not do satisfactorily, and the ability to definitely orient and thoroughly distribute granular particles as they are projected, which the previously known mechanically operated projecting machines would not do to the full extent desired in granular coated webs of this character.

Machines depending entirely upon electrostatic forces for the propulsion and orientation of granular materials have not been entirely satisfactory in their application to the coarse particles which, because of their greater bulk, were more difficult to lift and orient. The mechanically operated projecting apparatus of the prior art has been such that it would lift and propel to the required height particles of all sizes including those sizes that the electrostatic type of machine would lift only to a slight extent. The mechanically operated projecting apparatus of the prior art has not been entirely satisfactory, however, in the character of orientation produced by its use. Its operation, in so far as producing orientation is concerned, depends upon its imparting rather high velocities to the particle and, because of this requirement of high velocities, it has been found difficult to secure the desired degree of orientation with the mechanically operated projectors.

In apparatus built in accordance with our invention, electrostatic and mechanical forces are caused to co-act in producing results not obtainable heretofore with the apparatus known to the prior art. The application of mechanical forces to the particles assists the electrostatic forces, particularly, in the lifting and propulsion of the granules toward the adhesive coated web whereby, not only may larger and heavier particles be projected and oriented than can be done with the electrostatic machines of the prior art, but also lower field intensities can be used in connection with the projection of the smaller sizes of particles. This is a distinct advantage because the field intensity ordinarily required to project the particles is of such a magnitude that flash-over or sparking is very likely to happen.

While we have described our invention with specific illustrations, it is not intended that these illustrations shall define the scope of our invention. Various modifications may be made by those skilled in the art without departing from the spirit or scope of our invention as defined in the appended claims.

We claim:

1. Apparatus for the manufacture of granular coated webs comprising a grain projector which includes a movable carrier for granular material and means including a high tension electrode as an integral part thereof for vibrating said carrier, and means for supporting an adhesive coated web with an adhesive surface downward positioned above said grain projector.

2. Apparatus for the manufacture of granular coated webs comprising a grain projector which includes a permeable carrier for granular material and means for blowing a stream of gas through said permeable carrier comprising a hollow high tension electrode with a gas outlet adjacent to and beneath said carrier, and means for supporting an adhesive coated web with an adhesive coated surface downward positioned above said grain projector.

3. Apparatus for applying a coating of oriented abrasive particles to a moving web, comprising electrodes arranged one above another and spaced apart, means for applying a high electrical potential difference between the upper and lower electrodes, means for passing the web to be coated between the electrodes with an adhesive coated surface facing downwardly, a carrier for carrying abrasive particles over the lower electrode and into the electrostatic field between the electrodes, and means for projecting the particles upwardly from the carrier against the adhesively coated surface of the web while the particles are subjected to the orienting action of the electrostatic field.

4. Apparatus for applying a coating of oriented abrasive particles to a moving web, comprising electrodes arranged one above the other, means for applying a high electrical potential difference between the upper and lower electrodes, means for passing an adhesive coated web between said electrodes with the adhesive coated surface positioned downward, a feed belt movable between the adhesive coated web and the lower electrode, means for supplying abrasive particles to said belt to be carried between the electrodes and beneath the adhesive coated web, and means for projecting the particles upward from the belt against the downwardly facing adhesive coated surface of the web while such particles are subjected to the orienting action of the electrostatic field between the electrodes.

5. Apparatus for applying a coating of oriented abrasive particles to a moving web, comprising electrodes arranged one above the other, means for applying a high electrical potential difference between the upper and lower electrodes, means for passing an adhesive coated web between said electrodes with the adhesive coated surface positioned downward, a feed belt movable between the adhesive coated web and the lower electrode, means for supplying abrasive particles to said belt to be carried between the electrodes and beneath the adhesive coated web, and means for vibrating said feed belt, said apparatus being adapted to project the particles upward from the feed belt against the downwardly facing adhesive coated surface of the web while such particles are subjected to the orienting action of the electrostatic field between the electrodes.

6. Apparatus for applying a coating of oriented abrasive particles to a moving web, comprising electrodes arranged one above the other, means for applying a high electrical potential difference between the upper and lower electrodes, means for passing an adhesive coated web between said electrodes with the adhesive coated surface positioned downward, a permeable carrier passing over the lower electrode for carrying the abrasive particles into the electrostatic field between the electrodes, means for supplying abrasive particles to the permeable carrier, and means for blowing a stream of gas through said permeable carrier, said apparatus being adapted to propel the abrasive particles upward from the carrier against the downwardly facing adhesive coated surface of the web while such particles are subjected to the orienting action of the electrostatic field.

7. Apparatus for applying a coating of oriented abrasive particles to a moving web, comprising electrodes arranged one above another and spaced apart, means for applying a high electrical potential difference between the upper and lower electrodes, means for passing the web to be coated between the electrodes with an adhesive coated surface facing downwardly, means for carrying abrasive particles over the lower electrodes and into the electrostatic field between the electrodes, and means for projecting the particles upwardly from the carrier against the adhesively coated surface of the web while the grain is subjected to the orienting action of the electrostatic field, and means for producing an appreciable set of the adhesive without disturbing the orientation of the grain.

8. Apparatus for applying a coating of oriented abrasive particles to a moving web, comprising electrodes arranged one above the other, means for applying a high electrical potential difference between the upper and lower electrodes, means for passing an adhesive coated web between said electrodes with the adhesive coated surface positioned downward, a feed belt movable between the adhesive coated web and the lower electrode, means for supplying abrasive particles to said belt to be carried between the electrodes and beneath the adhesive coated web, and mechanical means for projecting the particles upward from the belt against the downwardly facing adhesive coated surface of the web while such particles are subjected to the orienting action of the electrostatic field between the electrodes.

9. Apparatus for applying a coating of elongated particles to a web, comprising electrodes arranged one above the other and spaced apart, means for applying a high electrical potential difference between the upper and lower electrodes to produce an electrostatic field therebetween, means for supporting the web to be coated between the electrodes with the adhesive coated surface positioned downward, means for conveying particles into the electrostatic field between the electrodes, and means for projecting the particles upwardly against the adhesively coated surface of the web while they are subjected to the orienting action of the electrostatic field.

10. Apparatus for the manufacture of coated webs comprising means for producing an electrostatic field including an upwardly facing electrode and a source of high electrical potential, means for passing an adhesive coated web over the electrode with the adhesive coated surface thereof downward, means for supplying elongated particles between said web and said upwardly facing electrode, and means for projecting the particles upwardly against the adhesively coated surface of the web while they are subjected to the orienting action of the electrostatic field.

ROMIE L. MELTON.
RAYMOND C. BENNER.
HENRY P. KIRCHNER.